US008669095B2

(12) United States Patent
Grill

(10) Patent No.: US 8,669,095 B2
(45) Date of Patent: Mar. 11, 2014

(54) METHOD FOR THE TREATMENT OF PROCESS GAS FOR BIOLOGICAL $H_2S$ REMOVAL

(71) Applicant: Jeffrey J. Grill, Long Beach, CA (US)

(72) Inventor: Jeffrey J. Grill, Long Beach, CA (US)

(73) Assignee: Clean Energy Fuels Corp., Newport Beach, CA (US)

( * ) Notice: Subject to any disclaimer, the term of this patent is extended or adjusted under 35 U.S.C. 154(b) by 0 days.

(21) Appl. No.: 13/684,829

(22) Filed: Nov. 26, 2012

(65) Prior Publication Data

US 2013/0095017 A1    Apr. 18, 2013

Related U.S. Application Data

(62) Division of application No. 13/276,205, filed on Oct. 18, 2011.

(51) Int. Cl.
*A61L 9/01*    (2006.01)

(52) U.S. Cl.
USPC ........................................................ 435/266

(58) Field of Classification Search
None
See application file for complete search history.

(56) References Cited

U.S. PATENT DOCUMENTS

| | | | |
|---|---|---|---|
| 4,395,385 A * | 7/1983 | Welsh | 423/234 |
| 5,352,115 A | 10/1994 | Klobucar | |
| 7,157,271 B2 * | 1/2007 | Ryu et al. | 435/294.1 |
| 7,731,779 B2 * | 6/2010 | Palumbo | 95/52 |
| 2005/0132883 A1 * | 6/2005 | Su et al. | 95/235 |
| 2009/0029062 A1 | 1/2009 | Bar | |
| 2010/0275781 A1 | 11/2010 | Tsangaris et al. | |
| 2011/0091953 A1 | 4/2011 | Bolin et al. | |

FOREIGN PATENT DOCUMENTS

| | | |
|---|---|---|
| GB | 2207872 | 2/1989 |
| WO | 99/29413 | 6/1999 |

OTHER PUBLICATIONS

Cirne et al., Control of sulphide during anaerobic treatment of S-containing wastewaters by adding limited amounts of oxygen or nitrate, Rev Environ Sci Biotechnol, 2008, 7:93-105.*
Patent Cooperation Treaty, International Search Report, PCT/US2012/060882, Dec. 17, 2012, pp. 1-2.
Patent Cooperation Treaty, International Search Report, PCT/US2012/060886, Jan. 7, 2013, pp. 1-2.

* cited by examiner

*Primary Examiner* — Suzanne M Noakes
*Assistant Examiner* — Stephen Chong
(74) *Attorney, Agent, or Firm* — Sheppard Mullin Richter & Hampton LLP

(57) ABSTRACT

The present invention provides a biological $H_2S$ removal system for the treatment of process gas, comprising: a housing that receives a process gas stream through a gas inlet, the housing comprising a plurality of layers through which the process gas stream flows while it is treated for $H_2S$ removal, and a gas outlet through which a treated gas stream exits; wherein air is added to the process gas stream prior to the process gas stream entering the housing.

14 Claims, 2 Drawing Sheets

METHOD FOR THE TREATMENT OF PROCESS GAS FOR BIOLOGICAL $H_2S$ REMOVAL

REFERENCE TO RELATED APPLICATIONS

This application is a divisional of U.S. patent application Ser. No. 13/276,205, filed on Oct. 18, 2011, the content of which is incorporated herein by reference in its entirety.

FIELD OF THE INVENTION

The invention broadly relates to biogas applications, and more particularly to a biological $H_2S$ removal system and method.

BACKGROUND OF THE INVENTION

Biogas refers to a gaseous fuel produced by the biological breakdown of organic matter in the absence of oxygen. It is produced by the anaerobic digestion or fermentation of biodegradable materials such as biomass, manure, sewage, municipal waste, green waste, plant material and crops. Biogas primarily comprises methane and carbon dioxide, and may contain small amounts of hydrogen sulphide, moisture and siloxanes.

The gases methane, hydrogen and carbon monoxide can be combusted or oxidized with oxygen. This energy release allows biogas to be used as a fuel. Biogas can be used as a fuel for any heating purpose. It can also be produced by anaerobic digesters where it is typically used in a gas engine to convert the chemical energy of the gas into electricity and heat. Anaerobic digestion is a series of processes in which microorganisms break down biodegradable material in the absence of oxygen, also used for industrial or domestic purposes to manage waste and/or to release energy.

The digestion process begins with bacterial hydrolysis of the input materials in order to break down insoluble organic polymers such as carbohydrates and make them available for other bacteria. Acidogenic bacteria then convert the sugars and amino acids into carbon dioxide, hydrogen, ammonia, and organic acids. These bacteria then convert these resulting organic acids into acetic acid, along with additional ammonia, hydrogen, and carbon dioxide. Finally, methanogens convert these products to methane and carbon dioxide.

Anaerobic digesters can use a multitude of feed stocks for the production of methane rich bio-gas including but not limited to purpose-grown energy crops such as maize. Landfills also produce methane rich bio-gas through the anaerobic digestion process. As part of an integrated waste management system, this bio-gas may be collected and processed for beneficial use while simultaneously reducing greenhouse gas emissions into the atmosphere.

Anaerobic digestion is widely used as a source of renewable energy. The process produces a biogas that can be used directly as cooking fuel, in combined heat and power gas engines or upgraded to natural gas quality biomethane. The utilization of biogas as a fuel helps to replace fossil fuels. The nutrient-rich digestate and/or Leachate that is also produced can be used as fertilizer.

$H_2S$ is a common contaminant in biogas applications such as landfills and digesters. Previously, biological $H_2S$ systems have been used for the removal of $H_2S$ from such biogas applications. In some cases, biological $H_2S$ removal systems can be several orders in magnitude lower in cost than expensive sulfur removal systems such as media or iron chelating systems. However, conventional biological systems can require more than 2% oxygen to maintain a stable removal rate of $H_2S$, and most raw gas from landfills and digesters contains far less than 2% oxygen. Accordingly, the raw gas from landfills and digesters cannot be processed using a conventional biological $H_2S$ removal system due to the scarcity of oxygen.

SUMMARY OF THE INVENTION

An embodiments of the present invention is directed toward a biological $H_2S$ removal system for the treatment of process gas, comprising: a housing that receives a process gas stream through a gas inlet, the housing comprising a plurality of layers through which the process gas stream flows while it is treated for $H_2S$ removal, and a gas outlet through which a treated gas stream exits; wherein air is added to the process gas stream prior to the process gas stream entering the housing.

In some embodiments, a pressure swing adsorption system or a water scrubbing system is used to separate the $H_2S$ into the process gas stream. In operation, the air is metered into the process gas stream by a blower or a compressor to achieve a predetermined oxygen concentration for biological use before release into the atmosphere or destruction. The process gas may comprise exhaust gas from an anaerobic digestion system or from a landfill gas system. The gas outlet feeds the treated gas stream into an anaerobic digester cleanup system or a landfill gas cleanup system.

In the above system, the gas inlet may comprise at least one aperture disposed in the bottom of the housing. In addition, the first layer may comprise a lower layer including a first mixing media, and wherein the second layer is disposed above the first layer and may comprise a second mixing media. The third layer is disposed above the second layer and may comprise at least one sprayer of a solution for $H_2S$ removal. In one implementation, the at least one sprayer is used to spray a neutralizing agent such as an NaOH solution on the process gas stream as it flows through the housing. The fourth layer may comprise a top layer of activated carbon disposed above the third layer. In one embodiment, the first and second layers comprise at least one corrosion resistant material selected from the group consisting of: plastic, ceramic, metal, mixing balls, raschig rings, and foam. The gas outlet may comprise an outlet manifold having at least one opening distributed across the top of the housing for achieving a substantially regular flow rate of gas within the housing.

A further embodiment of the invention is directed toward a method for the treatment of process gas for biological $H_2S$ removal, comprising: receiving a process gas stream from an anaerobic digestion system or from a landfill gas system; adding air to the process gas stream; passing the process gas stream through a gas inlet of a housing; treating the process gas stream for $H_2S$ removal; and passing a treated gas stream through a gas outlet in the housing.

The above method may further comprise the step of using a pressure swing adsorption system or a water scrubbing system to separate the $H_2S$ into the process gas stream prior to adding air to the process gas stream. Additionally, adding air to the process gas stream may comprise metering the air into the process gas stream to achieve a predetermined oxygen concentration for biological use before release into the atmosphere or destruction. In some embodiments, the method may further comprise the step of feeding the treated gas stream into an anaerobic digester cleanup system or a landfill gas cleanup system. Treating the process gas stream for $H_2S$ removal may comprise spraying the process gas stream with a neutralizing agent such as an NaOH solution for $H_2S$ removal.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Biogas is a renewable energy composed primarily of methane resulting from the natural decomposition of organic waste by anaerobic bacteria. Similar to natural gas, methane captured by a biogas system can be used to provide heat, electrical power or transportation biofuel. Biogas extraction can be used to: (i) produce green and renewable energy; (ii) reduce pollution and greenhouse gases; (iii) reduce waste odors and pathogens; and transform waste into valuable bio-fertilizer.

Fermentation, or anaerobic digestion, is the most common process that breaks down the organic waste. The organic waste may then be oxidized, thereby creating energy. Various types of organic materials include, but are not limited to: (i) biomass, (ii) landfill waste, (iii) sewage, (iv) manure, and (v) plant material. The most common gases produced are methane and carbon dioxide. Other gases that can be formed include hydrogen, nitrogen, and carbon monoxide. Methane, hydrogen, and carbon monoxide can be combusted to create heat and electricity. When biogas is created from existing waste streams, it reduces odors and methane emissions and creates two renewable resources. Methane is a potent greenhouse gas that contributes to global climate change. It is expected that a landfill gas energy project will capture about 60% to 90% of the methane emitted from the landfill, depending on system design and effectiveness.

There are two primary methods of recovering biogas for use as energy, namely: (i) by creating an anaerobic digestion system to process waste, most commonly manure or other wet biomass, and (ii) by recovering natural biogas production formed in existing landfills. Once recovered, biogas can be converted to energy using a number of methods.

Figure 1:
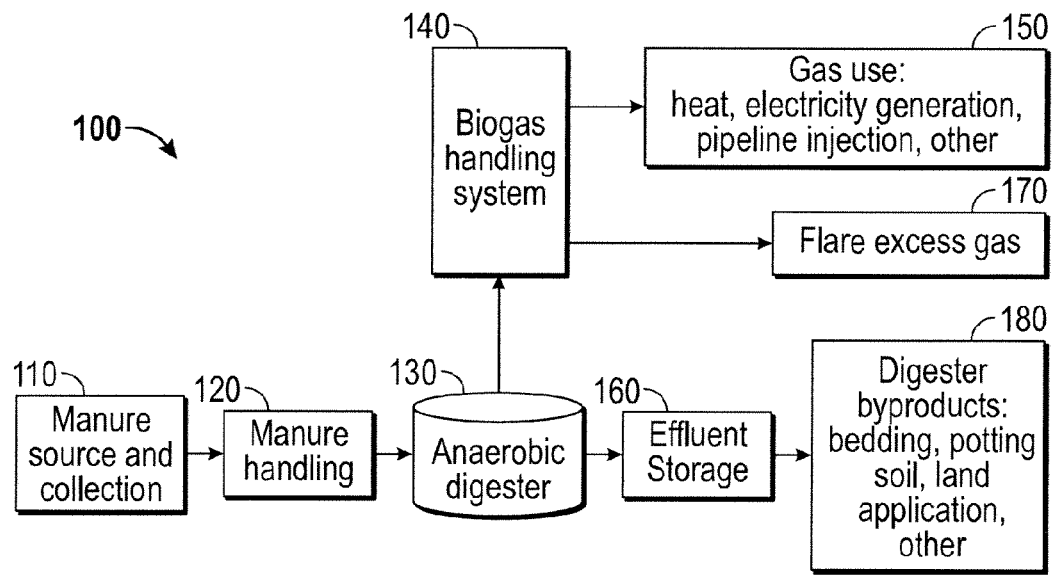
FIG. 1 is a flow diagram illustrating the stages of an exemplary anaerobic digestion system.

FIG. 1 is a flow diagram illustrating the stages of an exemplary anaerobic digestion system 100. Specifically, the an anaerobic digestion system 100 comprises a manure collection system 110, a manure handling system 120, an anaerobic digester 130, a biogas handling system 140, gas use devices 150, an effluent storage 160. In addition, at least one flare 170 may be used to burn excess gas. Digester products 180 may be used for bedding, potting soil, land applications, etc. More particularly, manure collection system 110 is used to gather manure and transport it to the anaerobic digester 130. In some cases, existing liquid/slurry manure management systems can be adapted to deliver manure to the anaerobic digester 130. The anaerobic digester 130 may be designed to stabilize manure and optimize the production of methane. A storage facility for digester effluent, or waste matter, is also required.

With further reference to FIG. 1, the anaerobic digester 130 outputs biogas into the biogas handling system 140. The biogas may contain approximately 60% methane and 40% carbon dioxide. It is collected, treated, and piped to a gas use device 150. By way of example, the biogas can then be upgraded to natural gas pipeline quality. It may also be used to generate electricity, as a boiler fuel for space or water heating, or for a variety of other uses. At least one flare 170 is also installed to destroy extra gas and as a back-up mechanism for the primary gas use device 160.

The anaerobic digester 130 may be made out of concrete, steel, brick, or plastic. Additionally, the digester 130 includes a tank for pre-mixing the waste and a digester vessel. In some embodiments, the anaerobic digester 130 may comprise a batch digesters or a continuous digester. A batch digester is loaded with organic materials, which are allowed to digest therein. The retention time depends on temperature and other factors. Once the digestion is complete, the effluent is removed and the process is repeated.

In further embodiments, the anaerobic digester 130 may comprise a continuous digester, wherein organic material is constantly or regularly fed into the digester, and wherein the material moves through the digester either mechanically or by the force of the new feed. Unlike batch-type digesters, continuous digesters produce biogas without the interruption of loading material and unloading effluent. Various types of continuous digesters include vertical tank systems, horizontal tank or plug-flow systems, and multiple tank systems.

Anaerobic digestion also occurs naturally underground in landfills, wherein the waste is covered and compressed by the weight of the material that is deposited above. This material prevents oxygen exposure, thereby allowing chemical reactions and microbes to act upon the waste. This encourages an uncontrolled process of biomass decay. The rate of production is affected by waste composition and landfill geometry. Landfill gas may comprise about 40% to 60% methane, and about 40% to 60% carbon dioxide.

Figure 2:
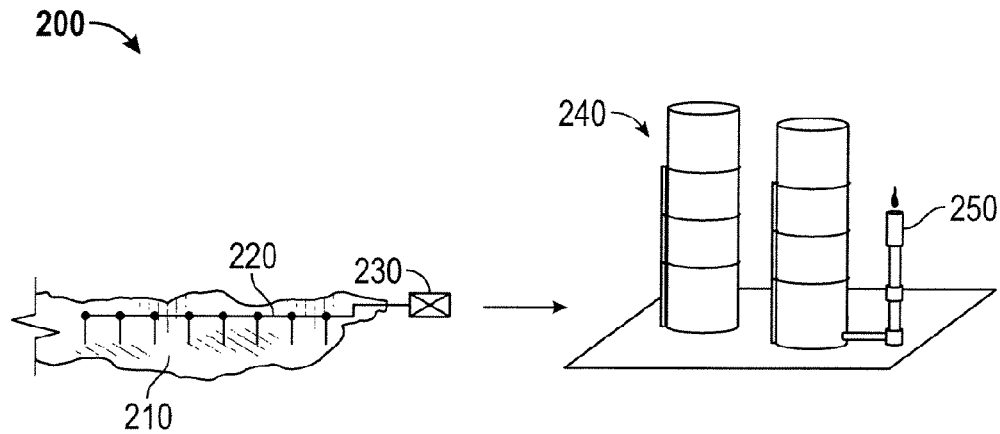
FIG. 2 is a diagram illustrating the stages of an exemplary landfill gas system.

FIG. 2 is a diagram illustrating an exemplary landfill gas system 200 including landfill 210, landfill gas wells 220 for active gas collection, landfill gas wellhead 230, landfill gas processing and treatment plant 240, and at least one landfill gas flare 250. Landfill gas is extracted from landfill 210 using a series of wells 220 and a blower/flare system. The landfill gas system 200 directs the collected gas to landfill gas processing and treatment plant 240, where it is processed and treated.

$H_2S$ is a common contaminant in biogas applications such as landfills and digesters. Previously, biological $H_2S$ systems have been used for the removal of $H_2S$ from such biogas applications. In some cases, biological $H_2S$ removal systems can be several orders in magnitude lower in cost than expensive sulfur removal systems such as media or iron chelating systems. However, conventional biological systems can require more than 2% oxygen to maintain a stable removal rate of $H_2S$, and most raw gas from landfills and digesters contains far less than 2% oxygen. For example, the oxygen level in a typical raw feed can be around 0.5% oxygen. Accordingly, the raw gas from landfills and digesters cannot be processed using a conventional biological $H_2S$ removal system due to the scarcity of oxygen.

Figure 3:
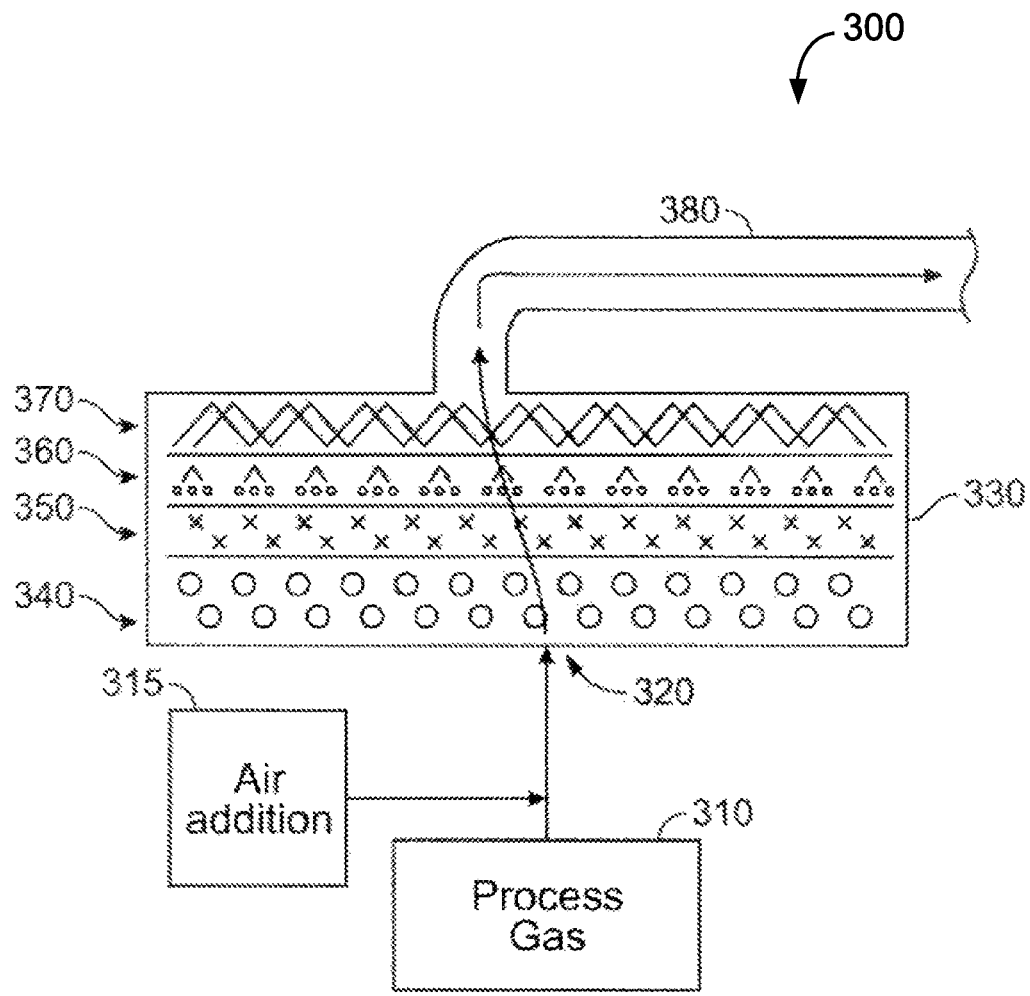
FIG. 3 illustrates the use of a caustic scrubber system in accordance with an embodiment of the invention.

FIG. 3 is a diagram illustrating the use of a biological $H_2S$ removal system 300 in accordance with an embodiment of the invention. In particular, a system such as a pressure swing adsorption (PSA) system or a water scrubbing system may be employed to separate $H_2S$ into a process gas stream 310. However, in embodiments featuring a PSA system for removing $H_2S$ into a process gas stream 310, no oxygen is present in the gas stream 310. As such, the biological $H_2S$ removal system 300 includes air addition 315 (e.g., via blower or compressor) that allows for the proper metering of air 315 into the process gas stream 310 to achieve the correct concentration for biological use before release into the atmosphere or destruction. Alternatively, a different source of oxygen may be employed in lieu or in addition to the air addition. Similarly, the process gas stream from a water scrubbing system may include no oxygen, or less than the needed 2% oxygen. In such cases, the air addition 315 (e.g., via blower or compressor) is employed to enable the proper metering of air 315 into the gas stream 310 to achieve the correct concentration for biological use before release into the atmosphere or destruction.

In particular, process gas stream 310 (e.g., from an anaerobic digestion system 100 or a landfill gas system 200) is fed into a gas inlet 320 of the $H_2S$ removal system 300, which comprises a housing 330 including a plurality of layers 340, 350, 360, 370 through which the process gas stream flows. The treated gas exits the housing through a gas outlet 380, which feeds the gas stream into an anaerobic digester cleanup system or a landfill gas cleanup system. The gas inlet 320 may comprise one or more apertures disposed in the bottom of housing 330. Alternatively, the gas inlet 320 may be part of a gas inlet manifold that evenly distributes the gas within the housing 330. In the illustrated embodiment, the first (lower) layer 340 comprises a first mixing media, the second layer 350 comprises a second mixing media, the third layer 360 comprises a sprayer of a solution for $H_2S$ removal, and the fourth (upper) layer 370 comprises activated carbon.

With continued reference to FIG. 3, the first and second mixing media layers 340, 350 may comprise any suitable corrosion resistant materials including, but not limited to, plastic, ceramic, metal, mixing balls, raschig rings, and foam. These mixing media layers 340, 350 form various contoured shapes to facilitate mixing. In some embodiments, the first mixing media layer 340 is the same as the second mixing media layer 350. In other embodiments, these layers 340, 350 are different materials. The third layer sprayer 360 may be used to spray a suitable wash solution or neutralizing agent on the gas as it flows through the biological $H_2S$ removal system 300. Suitable agents comprise water solutions, caustic solutions, and basic solutions such as NaOH solutions of varying pH. The activated carbon layer 370 is employed to remove $H_2S$ from the process gas stream. As illustrated, the gas outlet 380 may comprise an outlet manifold having one or more openings distributed across the top of the housing 330 for achieving a substantially regular flow rate of gas within the housing 330.

According to further embodiments of the invention, other process streams with $H_2S$ and no oxygen can be handled similarly. Such gas streams may be byproducts of certain biological laboratory and factory processes. It is proposed that a biological $H_2S$ removal system in accordance with the above-described embodiments be used in these and similar applications.

Another embodiment of the invention is directed toward a method for the treatment of process gas for biological $H_2S$ removal, comprising: receiving a process gas stream from an anaerobic digestion system or from a landfill gas system; adding air to the process gas stream; passing the process gas stream through a gas inlet of a housing; treating the process gas stream for $H_2S$ removal; and passing a treated gas stream through a gas outlet in the housing.

The above method may further comprise the step of using a pressure swing adsorption system or a water scrubbing system to separate the $H_2S$ from the sour gas stream prior to adding air to the sour gas stream. Additionally, adding air to the sour gas stream may comprise metering the air into the process gas stream to achieve a predetermined oxygen concentration for biological use before release into the atmosphere or destruction. In some embodiments, the method may further comprise the step of feeding the treated gas stream into an anaerobic digester cleanup system or a landfill gas cleanup system. Treating the sour gas stream for $H_2S$ removal may comprise spraying the process gas stream with a neutralizing agent such as water solutions, caustic solutions, and basic solutions such as NaOH solutions of varying pH for $H_2S$ removal.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one,"

"one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A method for the treatment of process gas for biological $H_2S$ removal, comprising:
   receiving a process gas stream from an anaerobic digestion system or from a landfill gas system;
   adding air to the process gas stream by metering the air into the process gas stream to achieve a predetermined oxygen concentration for biological use;
   passing the process gas stream through a gas inlet of a housing;
   treating the process gas stream for $H_2S$ removal, wherein treating the process gas stream for $H_2S$ removal comprises spraying the process gas stream with a neutralizing agent for $H_2S$ removal; and
   passing a treated gas stream through a gas outlet in the housing.

2. The method of claim 1, further comprising using a pressure swing adsorption system to separate the $H_2S$ into the process gas stream prior to adding air to the process gas stream.

3. The method of claim 1, further comprising using a water scrubbing system to separate the $H_2S$ into the process gas stream prior to adding air to the process gas stream.

4. The method of claim 1, further comprising feeding the treated gas stream into an anaerobic digester cleanup system.

5. The method of claim 1, further comprising feeding the treated gas stream into a landfill gas cleanup system.

6. The method of claim 1, wherein the neutralizing agent comprises a water solution.

7. The method of claim 1, wherein the neutralizing agent comprises a caustic solution.

8. The method of claim 1, wherein the neutralizing agent comprises a basic solution.

9. The method of claim 8, wherein the basic solution an NaOH solution having a pH selected for $H_2S$ removal.

10. A method for the treatment of process gas for biological $H_2S$ removal, comprising:
    receiving a process gas stream from an anaerobic digestion system or from a landfill gas system;
    using a pressure swing adsorption system to separate the $H_2S$ into the process gas stream;
    adding air to the process gas stream by metering the air into the process gas stream to achieve a predetermined oxygen concentration for biological use;
    passing the process gas stream through a gas inlet of a housing;
    treating the process gas stream for $H_2S$ removal, wherein treating the process gas stream for $H_2S$ removal comprises spraying the process gas stream with a neutralizing agent for $H_2S$ removal; and
    passing a treated gas stream through a gas outlet in the housing.

11. The method of claim 10, further comprising feeding the treated gas stream into an anaerobic digester cleanup system.

12. A method for the treatment of process gas for biological $H_2S$ removal, comprising:
    receiving a process gas stream from an anaerobic digestion system or from a landfill gas system;
    using a water scrubbing system to separate the $H_2S$ into the process gas stream; adding air to the process gas stream by metering the air into the process gas stream to achieve a predetermined oxygen concentration for biological use;
    passing the process gas stream through a gas inlet of a housing;
    treating the process gas stream for $H_2S$ removal, wherein treating the process gas stream for $H_2S$ removal comprises spraying the process gas stream with a neutralizing agent for $H_2S$ removal; and
    passing a treated gas stream through a gas outlet in the housing.

13. The method of claim 12, further comprising feeding the treated gas stream into an anaerobic digester cleanup system.

14. The method of claim 12, wherein the neutralizing agent is selected from the group consisting of: a water solution, a caustic solution, and a basic solution.

* * * * *